US007091850B2

(12) United States Patent
Katz

(10) Patent No.: US 7,091,850 B2
(45) Date of Patent: Aug. 15, 2006

(54) METHOD AND SYSTEM FOR THE SOUND TRIGGERED DISARMING OF A SECURITY SYSTEM

(75) Inventor: Fred Katz, Hauppauge, NY (US)

(73) Assignee: Honeywell International, Inc., Morristown, NJ (US)

( * ) Notice: Subject to any disclaimer, the term of this patent is extended or adjusted under 35 U.S.C. 154(b) by 241 days.

(21) Appl. No.: 10/854,544

(22) Filed: May 26, 2004

(65) Prior Publication Data

US 2005/0264411 A1 Dec. 1, 2005

(51) Int. Cl.

*B60R 25/10* (2006.01)
*H04B 3/36* (2006.01)
*G08B 1/08* (2006.01)
*G08B 25/08* (2006.01)
*G08B 13/00* (2006.01)
*H04R 29/00* (2006.01)

(52) U.S. Cl. .............................. 340/539.1; 340/539.11; 340/539.14; 340/539.16; 340/506; 340/692; 340/5.61; 381/56; 381/57; 367/199

(58) Field of Classification Search ............... 340/5.61, 340/692, 539.1–539.26; 367/199; 381/56–57
See application file for complete search history.

(56) References Cited

U.S. PATENT DOCUMENTS 5,640,142 A * 6/1997 Matatall et al. ............. 340/514
5,651,070 A * 7/1997 Blunt .......................... 381/56
6,175,307 B1 * 1/2001 Peterson ..................... 340/531
6,658,091 B1 * 12/2003 Naidoo et al. ................ 379/37
6,812,836 B1 * 11/2004 Soloway et al. ............ 340/542

* cited by examiner

*Primary Examiner*—Daniel Wu
*Assistant Examiner*—Lam Pham
(74) *Attorney, Agent, or Firm*—Scully, Scott, Murphy & Presser, P.C.

(57) ABSTRACT

The present invention relates to a system and method for the deactivation of an alarm system situated within a home or business environment by the use of a sound-activated wireless key device. This present invention describes a wireless key that "hears" a pulsing, warning tone, identifies the tone and automatically sends out a signal to disarm the alarm system thus allowing for the automatic hands-free deactivation of the alarm system. The invention comprises "listening" circuitry that is able to identify the sound of the audio warning, even when the invention is located within clothing or a handbag.

17 Claims, 3 Drawing Sheets

METHOD AND SYSTEM FOR THE SOUND TRIGGERED DISARMING OF A SECURITY SYSTEM

FIELD OF THE INVENTION

The present invention relates generally to the field of security systems that require a remote wireless key and local keypad for the activation or deactivation of the security system.

BACKGROUND OF THE INVENTION

Currently, when entering a residence or business protected by a home security system, an individual is confronted by a loud pulsating tone that is generated by the security system to remind the homeowner to disarm the security system. The security system can be disarmed by either entering in a multi-digit numeric security code, into a wall-mounted keypad, or by pushing a button on a handheld keyfob which generates a wireless, coded disarm message, which is transmitted to a receiver associated with the control panel.

SUMMARY OF THE INVENTION

The present invention relates to a system and method for the deactivation of an alarm system situated within a home or business environment by the use of a sound-activated wireless key device. This present invention describes a wireless key that "hears" a pulsing, warning tone, identifies the tone and automatically sends out a signal to clear (disarm) the alarm system thus allowing for the automatic hands-free deactivation of the alarm system. The invention comprises "listening" circuitry that is able to identify the sound of the audio warning, even when the invention is located within clothing or a handbag.

An embodiment of the present invention comprises a system for the remote disarming of a home or commercial security system. The system comprises an alarm base station, wherein the alarm base station comprises a RF receiver, and at least one alarm keypad in communication with the alarm base station, the alarm keypad comprising a speaker device. Further, the system comprises at least one remote wireless key, wherein the remote wireless key has the capability to communicate with the alarm base station. The remote wireless key comprises a processor, a microphone, wherein the microphone receives an audio input and outputs an electrical signal. A signal detector is in electrical communication with the processor and the microphone in addition to a RF signal transmitter that is in electrical communication with the processor.

A further embodiment of the present invention comprises a method for the remote disarming of a home or commercial security system. The method comprises the steps of receiving an audio tone signal that is transmitted by an alarm system keypad at a remote wireless key. In response to receiving the audio tone at the remote wireless key the wireless key transmits a disarming signal to an alarm base station, wherein upon receiving the disarming signal the base station disarms the security system.

BRIEF DESCRIPTION OF THE DRAWINGS

The accompanying drawings illustrate one or more embodiments of the invention and, together with the written description, serve to explain the principles of the invention.

Wherever possible, the same reference numbers are used throughout the drawings to refer to the same or like elements of an embodiment, and wherein.

DETAILED DESCRIPTION

One or more exemplary embodiments of the invention are described below in detail. The disclosed embodiments are intended to be illustrative only since numerous modifications and variations therein will be apparent to those of ordinary skill in the art. In reference to the drawings, like numbers will indicate like parts continuously throughout the views.

Figure 1:
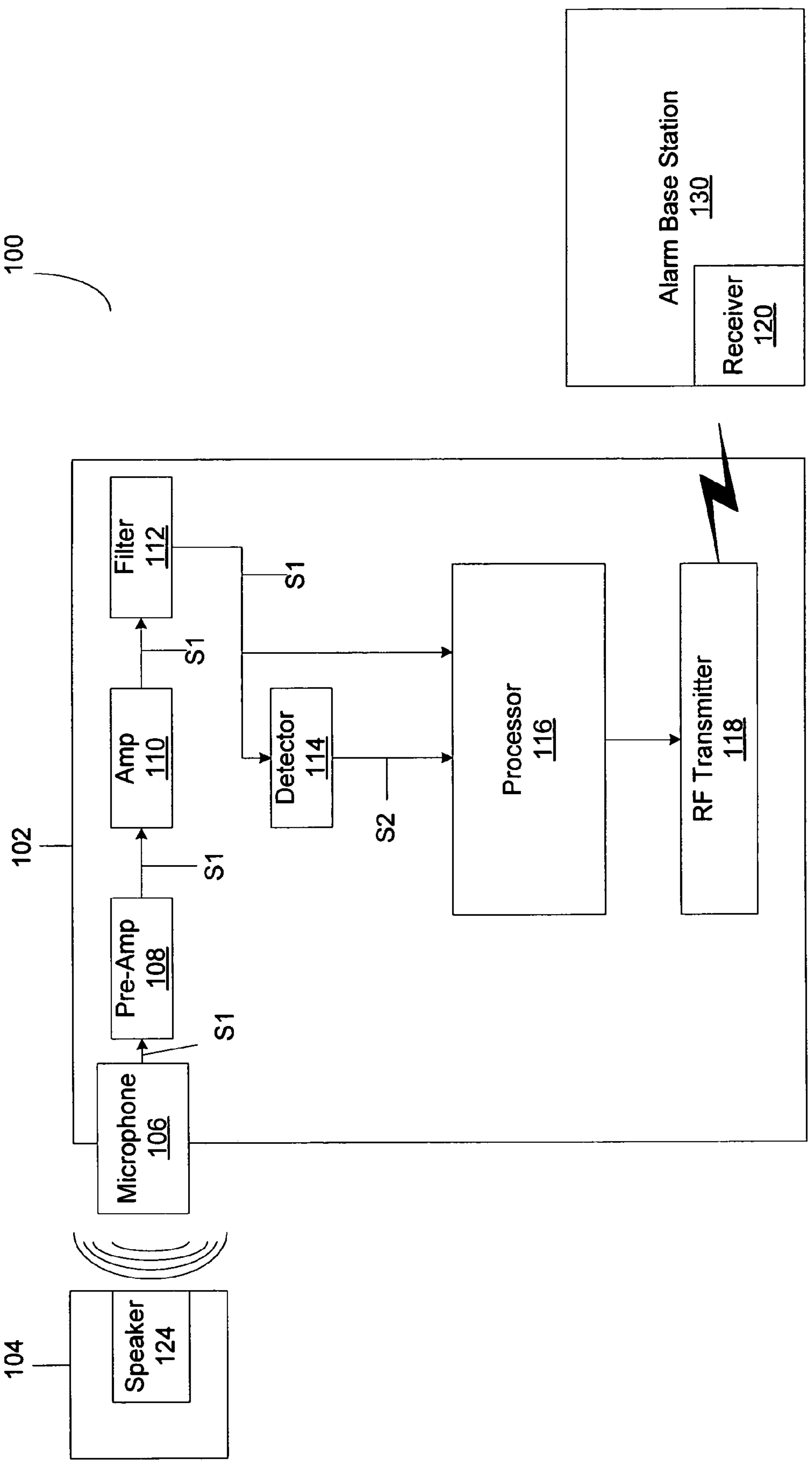
FIG. 1 is a diagram illustrating a system that relates to the present invention.

FIG. 1 illustrates a system for the remote disarming of a home or commercial security system. The system comprises an alarm base station 130, wherein the alarm base station 130 comprises a RF receiver 120, and at least one alarm keypad 104 in communication with the alarm base station 130, wherein the alarm keypad 104 comprises a speaker device 124. The system also comprises at least one remote wireless key 102, wherein the remote wireless key 102 has the capability to communicate with the alarm base station 130. The remote wireless key 102 comprises a processor 116, a microphone 106, wherein the microphone 106 receives an audio input and outputs an electrical signal, and a signal detector 114 that is in electrical communication with the processor 116 and the microphone 106. The remote wireless key 102 further comprises a RF signal transmitter 118 that is in electrical communication with the processor 116.

A pulsing audio tone signal S1 is broadcast from the speaker 124 of the alarm keypad 104 and enters the microphone 106 wherein S1 is pre-amplified at a pre-amplifier 108. Since a microphone is an extremely high input impedance device, circuitry is required to lower the circuit impedance and amplify the voltage level of S1. The pre-amplified S1 is amplified at an amplifier 110, giving it voltage gain and increasing the amplitude of S1. The amplified S1 is then input to a bandpass filter 112, the bandpass filter 112 being designed to be within the frequency bandwidth of the pulsating warning tone from the alarm keypad 104. The bandpass filter 112 will filter out the majority of audio signal noise present on S1. The resulting output from the bandpass filter 112 is signal information that is present within the bandwidth of the filter in addition to the filtering of other extraneous noises.

Figure 1A:
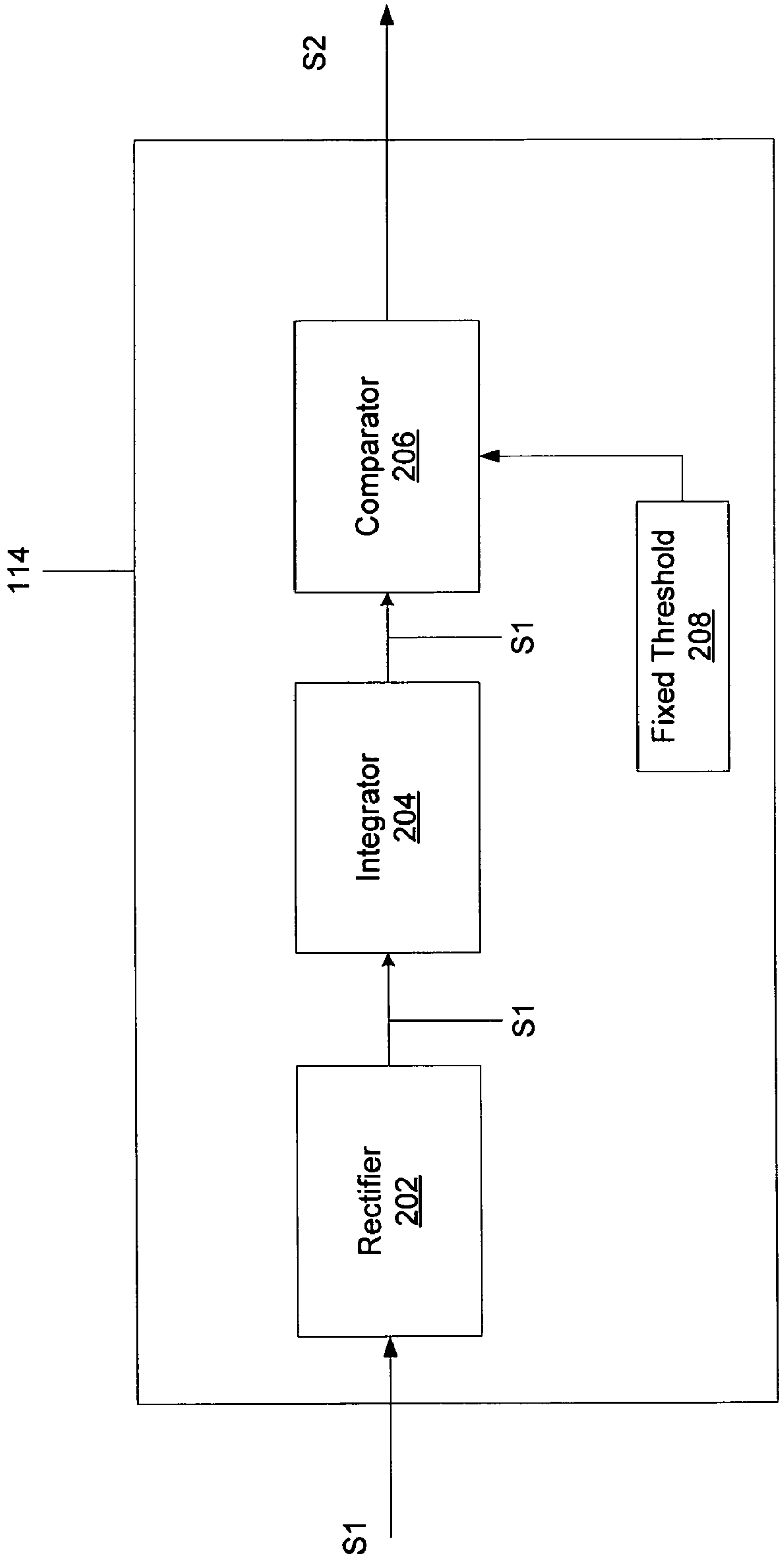
FIG. 1A is a diagram illustrating a detector that may be used within embodiments of the present invention.

The filtered S1 is then applied to an audio detector 114. As illustrated in FIG. 1A, within the detector 114, S1 is transmitted to a rectifier 202, wherein S1 is full-wave rectified, and an integrator 204 that integrates the bursts of sine waves that represent S1. Next, the integrated S1 is compared to a threshold level 208 that is fixed in a voltage comparator 206 within the detector. If S1 exceeds the preset threshold level 208, an interrupt signal S2 is sent to the input of the processor 116

The interrupt signal S2 is used to "wake-up" the processor 116, that is, since the processor 116 is normally in a dormant state when signals aren't present in order to conserve battery power. Once the processor 116 is activated, then it performs an analog to digital conversion of S1 and then performs a digital signal process on S1, which consists of bursts of sine waves.

The analog circuitry such as the preamplifier 108, amplifier 110 and the comparator 206 are configured from extremely low power analog circuitry that can stay on all the time, consuming only minimal battery power. Features on the S1 waveform consist of the period of the entire sine wave burst, the period of the individual sine wave, the total length of the signal, etc. These can be used either partially or totally to identify a legitimate pulsing audio tone signal that is broadcast from the alarm keypad 104.

It is to be added that it may be possible to shortcut some of the digital signal processing by analyzing only the detected signal waveform for repetition rate, although this is not as rigorous. The processor 116 will contain a program routine that generates the wireless protocol for message transmission. When the detection of a valid pulsing audio tone signal from the alarm keypad 104 is detected, a wireless disarm message will be transmitted to the alarm base station 130, wherein the base station will disarm the security system.

Figure 2:
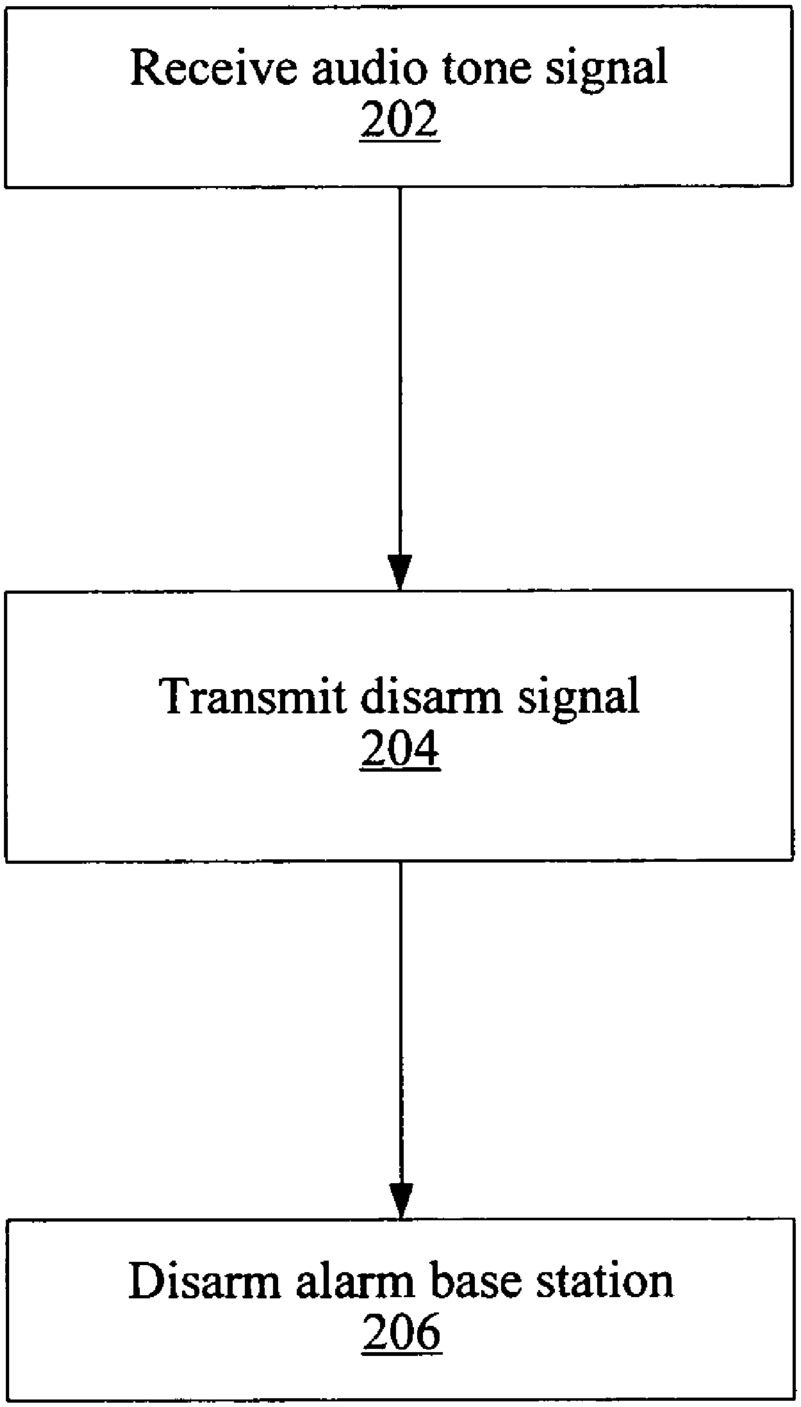
FIG. 2 is a flow diagram of a method that relates to the present invention.

FIG. 2 illustrates another embodiment of the present invention that comprises a method for the remote disarming of a home or commercial security system. The method comprises the steps of receiving an audio tone signal at a remote wireless key 102 at step 202, wherein the audio tone signal is transmitted by an alarm keypad 104. The audio tone signal comprises a predetermined audio tone that is represented by a waveform, wherein the waveform is used to identify an alarm base station 130.

An aspect of the present method comprises the step of performing an impedance lowering and amplification function upon the received audio tone signal before outputting the signal. Further aspects of the present invention involve amplifying and filtering the signal and transmitting the signal to a detector 114 and a processor 116. The detector 114 compares the signal to a predetermined voltage threshold level, and if the voltage level of the signal exceeds the predetermined threshold an interrupt signal is sent to the processor 116, the interrupt signal activating the processor from a dormant mode.

Upon activation of the processor 116 by the interrupt signal, the processor 116 performs an analog to digital conversion upon the signal to convert the signal's waveform and then digitally processes the signal waveform, wherein the digitally processed signal waveform is compared to a set of predetermined audio tone waveform data that is used to identify to the alarm base station.

If the digitally signal processed waveform is determined to match the predetermined audio tone waveform data then the processor 116 commands the transmitter 118 to transmit a disarm signal. At step 204, the wireless key 102 transmits the disarm signal to the alarm base station 130. Lastly, at step 206, the alarm base station 130 is disarmed upon the reception of the transmitted disarm signal.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed:

1. A system for the remote disarming of a home or commercial security system, comprising:
- an alarm base station, wherein the alarm base station comprises a RF receiver;
- at least one alarm keypad in communication with the alarm base station, wherein the alarm keypad comprises a speaker device; and
- at least one remote wireless key, wherein the remote wireless key has the capability to communicate with the alarm base station, wherein the remote wireless key comprises:
  - a processor;
  - a microphone, wherein the microphone receives an audio input and outputs an electrical signal;
  - a signal detector in electrical communication with the processor and the microphone; and
  - a RF signal transmitter in electrical communication with the processor.

2. The system of claim 1, wherein the speaker device of the alarm keypad broadcasts an audio signal, wherein the audio signal comprises a predetermined audio tone that is represented by a waveform that is used to identify the alarm base station.

3. The system of claim 2, wherein the alarm base station comprises a receiver for receiving a RF signal.

4. The system of claim 3, wherein the remote wireless key further comprises a pre-amplifier, the pre-amplifier receiving the electrical signal output by the microphone and performing an impedance lowering and amplification function upon the signal before outputting the signal.

5. The system of claim 4, wherein the signal output by the pre-amplifier is input to an amplifier.

6. The system of claim 5, wherein the signal input to the amplifier, is amplified and transmitted to a bandpass filter, wherein the bandpass filter filters the signal and transmits signal to the detector and the processor.

7. The system of claim 6, wherein the detector compares the signal to a predetermined voltage threshold level, and if the voltage level of the signal exceeds the predetermined threshold an interrupt signal is sent to the processor, wherein the interrupt signal is used to activate the processor from a dormant mode.

8. The system of claim 7, wherein upon activation of the processor by the interrupt signal, the processor performs an analog to digital conversion upon the signal to convert the signals waveform and then digitally processes the signal waveform, wherein the digitally processed signal waveform is compared to a set of predetermined audio tone waveform data that is used to identify to the alarm control panel.

9. The system of claim 8, wherein if the digitally signal processed waveform is determined to match the predetermined audio tone waveform data then the processor commands the transmitter to transmit a disarm signal.

10. The system of claim 9, wherein the alarm base station will disarm upon receiving the disarm signal transmitted from the remote wireless key.

11. A method for the remote disarming of a home or commercial security system, comprising the steps of:
- receiving an audio tone signal at a remote wireless key, wherein the audio tone signal is transmitted by an alarm keypad;
- transmitting a disarm signal from the wireless key to an alarm base station in response to the received audio tone; and
- disarming the alarm base station upon the reception of the transmitted disarm signal.

12. The method of claim 11, wherein the alarm keypad comprises a speaker device, wherein the speaker device broadcasts an audio signal, the audio signal comprising a predetermined audio tone that is represented by a waveform that is used to identify the alarm base station.

13. The method of claim 12, wherein the step of transmitting a disarm signal further comprises the step of performing an impedance lowering and amplification function upon the received audio tone signal before outputting the signal.

14. The method of claim 13, further comprising the step of amplifying and filtering the signal and transmitting the signal to a detector and a processor.

15. The method of claim 14, wherein the detector compares the signal to a predetermined voltage threshold level, and if the voltage level of the signal exceeds the predetermined threshold an interrupt signal is sent to the processor, the interrupt signal activating the processor from a dormant mode.

16. The method of claim 15, wherein upon activation of the processor by the interrupt signal, the processor performs an analog to digital conversion upon the signal to convert the signal's waveform and then digitally processes the signal waveform, wherein the digitally processed signal waveform is compared to a set of predetermined audio tone waveform data that is used to identify to the alarm base station.

17. The method of claim 16, wherein if the digitally signal processed waveform is determined to match the predetermined audio tone waveform data then the processor commands the transmitter to transmit a disarm signal.

* * * * *